(12) United States Patent
Jeong

(10) Patent No.: US 7,751,571 B2
(45) Date of Patent: Jul. 6, 2010

(54) SOUND SIGNAL PROCESSOR AND METHOD FOR PROCESSING SOUND SIGNAL USING THE SAME

(75) Inventor: Hyun Ho Jeong, Gumi-si (KR)

(73) Assignee: LG Electronics Inc., Seoul (KR)

( * ) Notice: Subject to any disclaimer, the term of this patent is extended or adjusted under 35 U.S.C. 154(b) by 995 days.

(21) Appl. No.: 11/368,416

(22) Filed: Mar. 7, 2006

(65) Prior Publication Data

US 2007/0127727 A1    Jun. 7, 2007

(30) Foreign Application Priority Data

Dec. 1, 2005    (KR) ...................... 10-2005-0116408

(51) Int. Cl.
 *H04H 40/81* (2008.01)
 *H04H 40/54* (2008.01)
 *H04N 7/00* (2006.01)
(52) U.S. Cl. ............................. 381/11; 381/12; 348/485
(58) Field of Classification Search ................... 381/11, 381/12, 2, 10; 348/737, 738, 739, 632, 480–485; 455/168.1
See application file for complete search history.

(56) References Cited

U.S. PATENT DOCUMENTS

| | | | |
|---|---|---|---|
| 5,103,315 A | 4/1992 | Kufta et al. ................. 358/198 |
| 6,707,917 B1 * | 3/2004 | Landgraf et al. .............. 381/11 |
| 7,164,894 B2 * | 1/2007 | Nagahama et al. ........ 455/168.1 |
| 7,457,420 B2 * | 11/2008 | Nhu ............................ 381/11 |
| 2005/0047603 A1 | 3/2005 | Nhu | |

FOREIGN PATENT DOCUMENTS

| | | |
|---|---|---|
| DE | 35 17 495 C1 | 12/1986 |
| DE | 41 28 727 A1 | 3/1993 |

(Continued)

OTHER PUBLICATIONS

European Search Report dated May 17, 2006.

*Primary Examiner*—Curtis Kuntz
*Assistant Examiner*—Hai Phan
(74) *Attorney, Agent, or Firm*—KED & Associates LLP

(57) ABSTRACT

A sound signal processor and a method for processing a sound signal using the same enables the elimination of a plop noise generated in the course of a sound mode checking operation. The sound signal processor receives a sound intermediate frequency (SIF) signal and includes a channel mode discriminator for determining a current sound mode of the received SIF signal; a mode transition checker for performing a checking operation to determine whether the current sound mode has resulted from a transition from a first sound mode to a second sound mode; an amplitude measurement circuit for measuring an amplitude of the received SIF signal; and a controller for controlling a drive of the mode transition checker according to the measured amplitude. If the sound channel mode of a currently input sound signal is a mono channel mode, the amplitude of the input sound signal is measured, and the measured amplitude is compared to a reference level. A process for checking whether the sound mode makes a transition from the mono channel mode to a stereo/dual channel mode is performed according to the comparison, whereby the process is either repeatedly executed or is discontinued. The checking process is prevented from being unnecessarily executed and thereby prevents the generation of a plop noise.

20 Claims, 3 Drawing Sheets

FOREIGN PATENT DOCUMENTS

| | | |
|---|---|---|
| EP | 0 374 433 A1 | 6/1990 |
| EP | 0 519 667 A1 | 12/1992 |
| EP | 0 996 294 A2 | 4/2000 |
| EP | 0 996 294 A3 | 4/2000 |
| JP | 04-212263 | 8/1992 |
| JP | 07-154718 | 6/1995 |
| JP | 07-162326 | 6/1995 |
| JP | 07-212263 | 8/1995 |
| KR | 10-1997-0019737 | 4/1997 |
| KR | 10-2000-0021671 | 4/2000 |
| KR | 10-2002-0087776 | 11/2002 |
| KR | 10-2006-0051592 | 5/2006 |
| WO | WO 99/30534 | 6/1999 |

* cited by examiner

SOUND SIGNAL PROCESSOR AND METHOD FOR PROCESSING SOUND SIGNAL USING THE SAME

This application claims the benefit of Korean Patent Application No. 10-2005-0116408, filed on Dec. 5, 2005, which is hereby incorporated by reference as if fully set forth herein.

BACKGROUND OF THE INVENTION

1. Field of the Invention

The present invention relates to sound signal processing, and more particularly, to a sound signal processor and a method for processing a sound signal using the same, in which a sensed amplitude is used to prevent the generation of a plop noise when performing a sound mode checking operation.

2. Discussion of the Related Art

Television broadcast signals include separate audio and video components, i.e., a sound signal and a video signal. The sound signal contains sound system identification data for notifying a receiving system of transmission parameters, e.g., the sound carrier frequency, which may correspond to a broadcast for an M system or N system, a B system or G system, an I system, or a D system or K system, thereby necessitating reception based on MN, BG, I, or DK sound systems, respectively. Specific transmission parameters are typically set and transmitted by the broadcaster according to country or region but may vary according to transmission channel.

Meanwhile, a sound signal processor is provided to a video device such as a television receiver, which should be coordinated with the above transmission parameters. This coordination may be performed manually by referencing an guide for the television receiver's sound signal processor to save the sound mode settings, and multiple setup operations may be required for each of a given set of transmission channels. Therefore, a contemporary television receiver is provided with a function for automatic sound system setup, using a controller connected to a channel mode discriminator and a mode transition checker, to demodulate a sound intermediate frequency signal (hereinafter called a sound signal or SIF input) according to the appropriate sound system and a specific sound mode.

In the operation of such a sound signal processor, to which a sound signal as above is applied, the sound system is discriminated according to the sound system data provided in the broadcast signal. At the same time, according to the sound mode data, it is determined whether the currently applied sound signal, as determined by a currently broadcast signal, corresponds to a mono channel mode or to a stereo/dual channel mode, which may be one of several specific modes. That is, a continuous checking operation is performed with respect to the SIF input of the broadcast signal, to determine whether the sound signal as broadcast makes a transition from the mono channel mode to a specific stereo/dual channel mode. Thus, if a broadcast signal in the mono channel mode is received, a transition to the stereo/dual channel mode is detected, and once in the stereo/dual channel mode, it is continuously determined whether the current broadcast signal makes a further transition from a current stereo/dual channel mode to any one of its several specific sound modes. In other words, the mono channel mode (channel 1) consists of only one mode, but the stereo/dual channel mode (channel 2) consists of multiple modes.

FIG. 2 diagrams the above checking operation as executed by a contemporary sound signal processor. When a specific sound channel mode command is applied to the sound signal processor according to a broadcast channel, or when the video device is initially powered, if the received broadcast sound signal is in a mono channel mode 100, the continuous checking operation determines when, or whether, the mono channel mode makes a transition to a stereo/dual channel mode 101. In doing so, if the current sound channel mode corresponds to the mono channel mode 100, the controller (not shown) selects a sound system, namely, one of an MN system 102, a BG system 103, an I system 104, and a DK/K1/K2/K3 system 105, in accordance with the sound signal carrier frequency as set by the SIF input of the broadcast signal. Here, the sound signal of the MN system 102 has a carrier frequency of 4.5 MHz, that of the BG system 103 has a carrier frequency of 5.5 MHz, that of the I system 104 has a carrier frequency of 6.0 MHz, and that of the DK/K1/K2/K3 system 105 has a carrier frequency of 6.5 MHz, so that a filter value may be set for demodulation according to the corresponding sound system. The set filter value is also used in checking a specific sound mode of the sound signal.

Thereafter, once the current sound channel mode corresponds to the stereo/dual channel mode 101, a specific channel-2 sound mode of the selected sound system can be determined. For example, if the sound system corresponds to the MN system 102, it may be determined whether the current stereo/dual channel mode is a Zweiton mode 102*a*; if the sound system corresponds to the BG system 103, it may be determined whether the current stereo/dual channel mode is one of a near-instantaneously companded audio multiplex (NICAM) mode 103*a* or a Zweiton mode 103*b*; if the sound system corresponds to the I system 104, it may be determined whether the current stereo/dual channel mode is a NICAM mode 104*a*; and if the sound system corresponds to the DK/K1/K2/K3 system 105, it may be determined whether the current stereo/dual channel mode is a NICAM mode 105*a* or any one of three Zweiton modes 105*b*, 105*c*, and 105*d*.

Notably, however, each of the BG and DK/K1/K2/K3 systems 103 and 105 includes multiple sound modes, such that, in the case of the selected sound system being either of the BG and DK systems, the continuous checking operation determines the current stereo/dual channel mode as being one of multiple possible sound modes. That is, it is possible that the stereo/dual channel mode transitions between the BG system modes 103*a* and 103*b* or among the DK/K1/K2/K3 system modes 105*a*-105*d*.

Therefore, in a contemporary sound signal processor, while a broadcast signal in the mono channel mode is being received, the controller keeps checking whether the broadcast sound signal makes a transition to one of the stereo/dual channel modes. This sequentially performed operation of continuously checking for a sound mode transition produces an undesirable audio artifact, sometimes referred to as "plop noise," which degrades the sound quality of a video device, e.g., a television receiver, adopting such a sound processor.

SUMMARY OF THE INVENTION

Accordingly, the present invention is directed to a sound signal processor and processing a sound signal using the same that substantially obviates one or more to limitations and disadvantages of the related art.

An object of the present invention is to provide a sound signal processor and a processing a sound signal using the same, by which a plop noise generated in the course of checking a transition of a sound channel mode can be removed to enhance sound quality in a video device.

In the present invention, if the sound channel mode of a currently input sound signal is a mono channel mode, an amplitude value of the input sound signal is measured. The measured amplitude value is compared to a reference level, which is a threshold for detecting a pilot signal of a stereo/dual channel mode. Then, a process for checking whether the sound mode makes a transition from the mono channel mode to the stereo/dual channel mode is performed according to the comparison, whereby the process is either repeatedly executed or is discontinued. This amplitude measurement and level comparison (amplitude detection) is carried out at least one time. Hence, the present invention prevents the checking process from being unnecessarily executed and thereby prevents the generation of a plop noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a sound signal processor for receiving a sound intermediate frequency (SIF) signal, a sound signal processor comprises a channel mode discriminator for determining a current sound mode of the received SIF signal; a mode transition checker for performing a checking operation to determine whether the current sound mode has resulted from a transition from a first sound mode to a second sound mode; an amplitude measurement circuit for measuring an amplitude of the received SIF signal; and a controller for controlling a drive of the mode transition checker according to the measured amplitude.

According to another aspect of the present invention, there is provided a method of processing a sound signal. The method comprises determining a current sound mode of the sound signal; checking the determined current sound mode to detect a transition from a first sound mode to a second sound mode; measuring an amplitude of the received sound signal; and repeatedly performing the checking according to the measured amplitude.

According to another aspect of the present invention, there is provided a television receiver having an apparatus for processing a sound signal. The television receiver comprises a system discriminator for determining a sound system according to sound system data included in the sound signal; a channel mode discriminator for determining a current sound mode of the received sound signal; a mode transition checker for performing a checking operation to determine whether the determined current sound mode has resulted from a transition from a first sound mode to a second sound mode; a demodulator for demodulating the sound signal according to the determined sound system and the determined current sound mode; a detector for detecting an amplitude of the demodulated sound signal; and a controller for controlling a drive of the mode transition checker according to the detected amplitude of the sound signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 2:
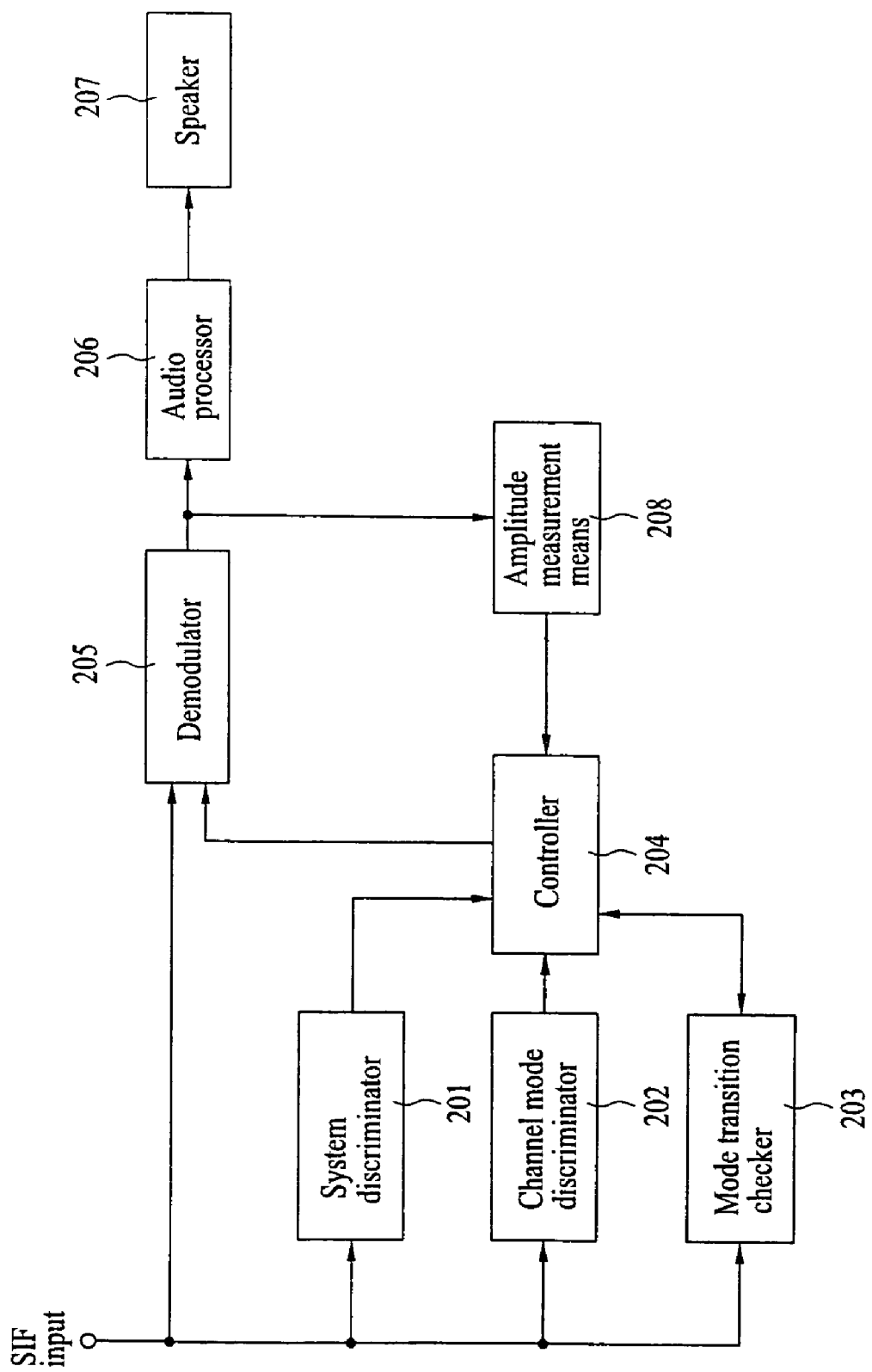
FIG. 2 is a block diagram of a sound signal processor according to the present invention.

Referring to FIG. 2, a sound signal processor according to the present invention includes a system discriminator 201 for determining a sound system of a broadcast sound signal by receiving a sound intermediate frequency (SIF) signal corresponding to the broadcast sound signal; a channel mode discriminator 202 for determining whether a currently broadcast sound signal corresponds to a mono channel mode or a stereo/dual channel mode; a mode transition checker 203 for continuously checking whether a next sound signal makes a transition to one of a plurality of stereo/dual sound modes, if the currently input sound signal corresponds to a broadcast of the mono channel mode; a controller 204 for generating a demodulation control signal to demodulate the sound signal according to determinations made by the system and channel mode discriminators; a demodulator 205 for demodulating the sound signal according to the control of the controller; an audio processor 206 for processing the demodulated sound signal; a speaker 207 for outputting the audible sound signal; and an amplitude measurement means 208 for providing a detected amplitude value. Accordingly, each of the system discriminator 201, channel mode discriminator 202, and mode transition checker 203 are configured to provide dynamic data inputs to the controller 204 based on a currently broadcast (received) sound signal. Meanwhile, the controller 204 of the present invention provides a drive control signal to the mode transition checker 203 based on the detected amplitude value.

The amplitude measurement means of the present invention is a circuit for measuring an amplitude of the received SIF signal and may be connected to an output of the demodulator 205 or may be connected to receive an input signal before fully effecting demodulation, for example, to the SIF input. Accordingly, the amplitude measurement means of the present invention serves to measure the sound signal level and thus determines (detects) the measured amplitude, based on one of a peak value and a root-mean-square (RMS) value, to be compared with a reference level. In an exemplary embodiment of the present invention, the amplitude measurement means 208 measures the amplitude of the sound signal demodulated by the demodulator 205.

A sound intermediate frequency (SIF) signal, which is a sound signal of a broadcast signal that includes data indicative of a sound system and a current sound mode, is input to each of the system discriminator 201, channel mode discriminator 202, stereo/dual mode checker 203, and demodulator 205. The demodulator 205 receives the demodulation control signal from the controller 204, which dynamically controls the demodulation of the SIF signal (input sound signal) according to the sound system data and the sound mode data. Thus, the demodulator 205 demodulates the received sound signal according to the sound system as determined by the system discriminator 201 and according to the sound mode as determined by the channel mode discriminator 202.

To achieve the above dynamic control of the demodulation according to the currently broadcast sound signal, the system discriminator 201 receives the SIF signal input and determines one of a plurality of sound systems, e.g., the MN, BG, I, or DK/K1/K2/K3 system, which is set by a broadcaster according to country or region and is identifiable by the sound system data included in the broadcast sound signal. At the same time, the channel mode discriminator 202 receives the SIF signal input and determines whether the received sound signal is being broadcast in the mono channel mode or in a stereo/dual channel mode, and if the received sound signal is in the mono channel mode, the mode transition checker 203 continuously checks whether the received sound signal makes a transition to a stereo/dual channel mode.

If the sound mode of the currently broadcast sound signal corresponds to a stereo/dual channel mode, the mode transition checker 203 is driven by the controller 204 to check continuously for a transition of the sound channel mode. This continuous checking operation is necessary since the stereo/dual channel mode may include a plurality of sound modes corresponding to differing frequencies for a given sound system, and since the specific mode may vary at any time, for example, in the event of a command input for changing a broadcast channel. Further sound channel mode variations are possible in the event of sound system changes. Meanwhile, as the mono channel mode includes one mode only, if the sound mode of the broadcast sound signal stays in the mono channel mode, i.e., no transition from the mono channel mode, there is no need to drive the mode transition checker 203 to check continuously for a further transition to one or more of the stereo/dual channel modes.

Accordingly, in the method of the present invention, the demodulator 205 demodulates the received signal according to dynamic determinations based on a currently broadcast sound signal, and the amplitude of the demodulated sound signal is measured and compared to a reference level to generate a detected amplitude value input to the controller 204, which, in addition to generating the demodulation control signal, selectively controls a drive of the mode transition checker 203 according to the measured amplitude. The selective drive of the mode transition checker 203 enables a prevention of unnecessary checking operations by checking whether the mono channel mode makes a transition to the stereo/dual channel mode only if the sound mode of the sound signal corresponds to the mono channel mode; if the sound mode of the sound signal corresponds to the stereo/dual channel mode, a specific sound mode transition checking is continuously performed. That is, a current sound mode of the sound signal is determined, and the sound mode as determined is checked to detect a transition from a first sound mode (the mono channel mode) to a second sound mode (a stereo/dual channel mode); then, the amplitude of the received sound signal is measured, and the checking operation is repeated according to the measured amplitude.

The above reference level may be set equal to a noise threshold, which is a level enabling detection of a pilot signal of the stereo/dual channel mode. Thus, if the sound signal amplitude, which can be measured as a peak value or RMS value of the demodulated sound signal, is less than the reference level, that is, at a level below the noise floor, the controller 204 stops driving the mode transition checker 203. Otherwise, the controller 204 continues to drive the mode transition checker 203. That is, if the measured amplitude is not less than the reference level, and therefore at a level enabling pilot signal detection, the controller 204 continues to drive the mode transition checker 203. Hence, an undesirable noise artifact, which may be generated from searching a sound mode transition when the sound signal input is low, can be prevented. In particular, if the peak value is less than the reference level (noise threshold), the sound signal is being received at a level below a noise floor, so that a plop noise, attributable to a progression of the sound mode checking, occurs audibly for each instance of the mode transition checker 203 checking the sound mode to identify a particular sound mode transition. In such instances, however, according to the prevent invention, whereby the mode transition checker 203 is controllable according to the sound signal amplitude, the effect of the plop noise can be circumvented by discontinuing the drive of the mode transition checker when sound mode transition checking is unnecessary.

Figure 1:
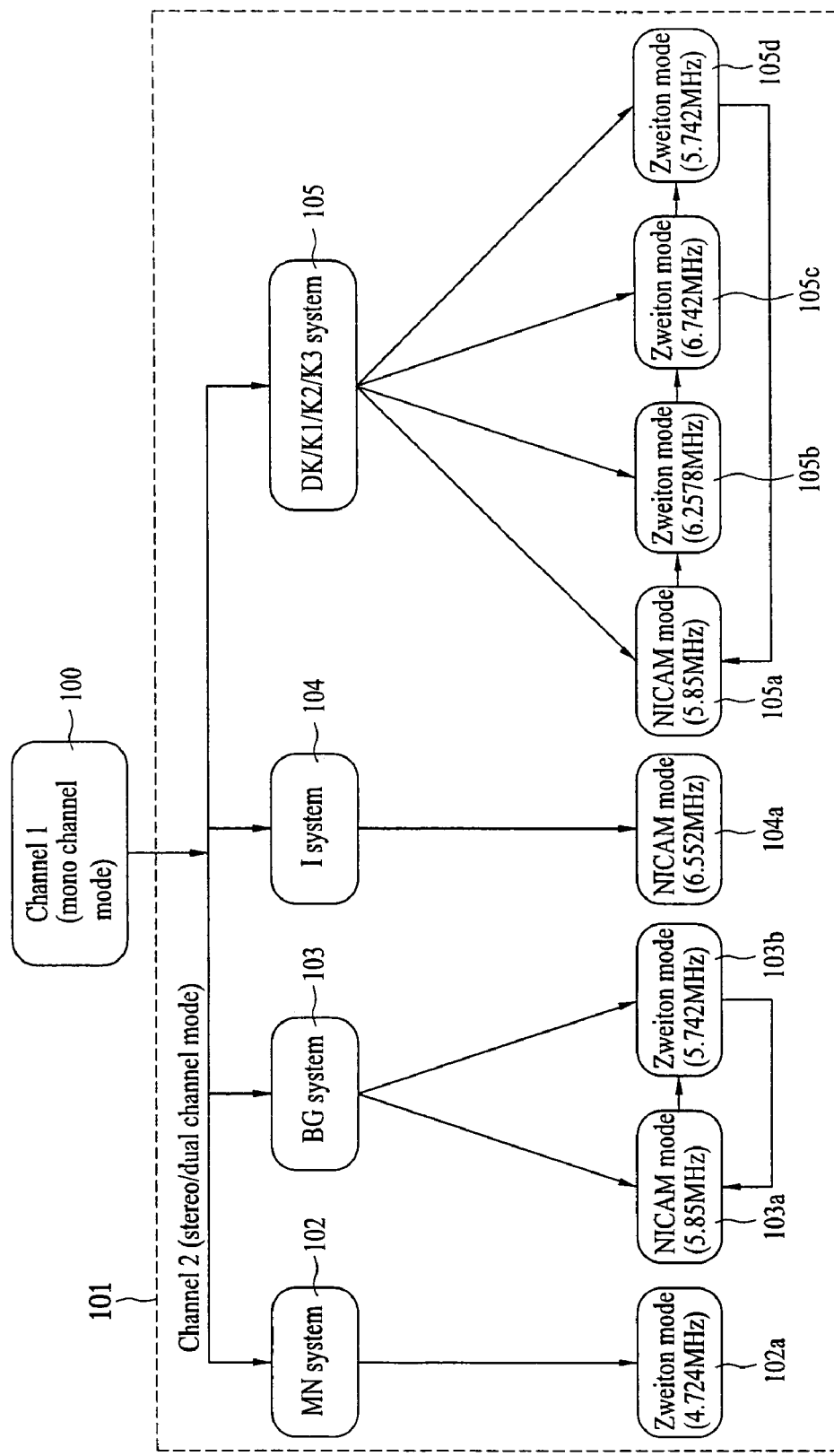
FIG. 1 is a diagram for illustrating a process executed by a contemporary sound signal processor.

In the operation of the sound signal processor according to the present invention, once the apparatus is powered, typically by powering a video device in which the sound signal processor is included, or when a tuning command is input to select a broadcast channel, a sound signal of the corresponding channel (the SIF input) is applied to the sound system discriminator 201, which determines the type of sound system to which the sound signal belongs, for example, one of the MN, BG, I, and DK/K1/K2/K3 sound systems. Meanwhile, the channel mode discriminator 202 determines whether the received sound signal is in the mono channel mode or in a stereo/dual channel mode. Based on this mode determination, i.e., for a stereo/dual channel mode determination, the mode transition checker 203 continuously checks the various sound modes of a sound system having multiple sound modes. Namely, upon a transition from the mono channel mode, the mode transition checker 203 checks the input SIF signal to determine which one of the available stereo/dual channel modes corresponds to the sound signal currently being broadcast. For example, referring to FIG. 1, if the sound system corresponds to the BG or DK DK/K1/K2/K3 system 103 or 105, the mode transition checker 203 continuously checks between the NICAM mode 103a and Zweiton mode 103b, in which the sound signal would be broadcast at 5.85 MHz or 5.742 MHz, respectively, or among the NICAM mode 105a and Zweiton modes 105b, 105c, and 105d, in which the sound signal would be broadcast at 5.85 MHz, 6.2578 MHz, 6.742 MHz, or 5.742 MHz, respectively.

Figure 3:
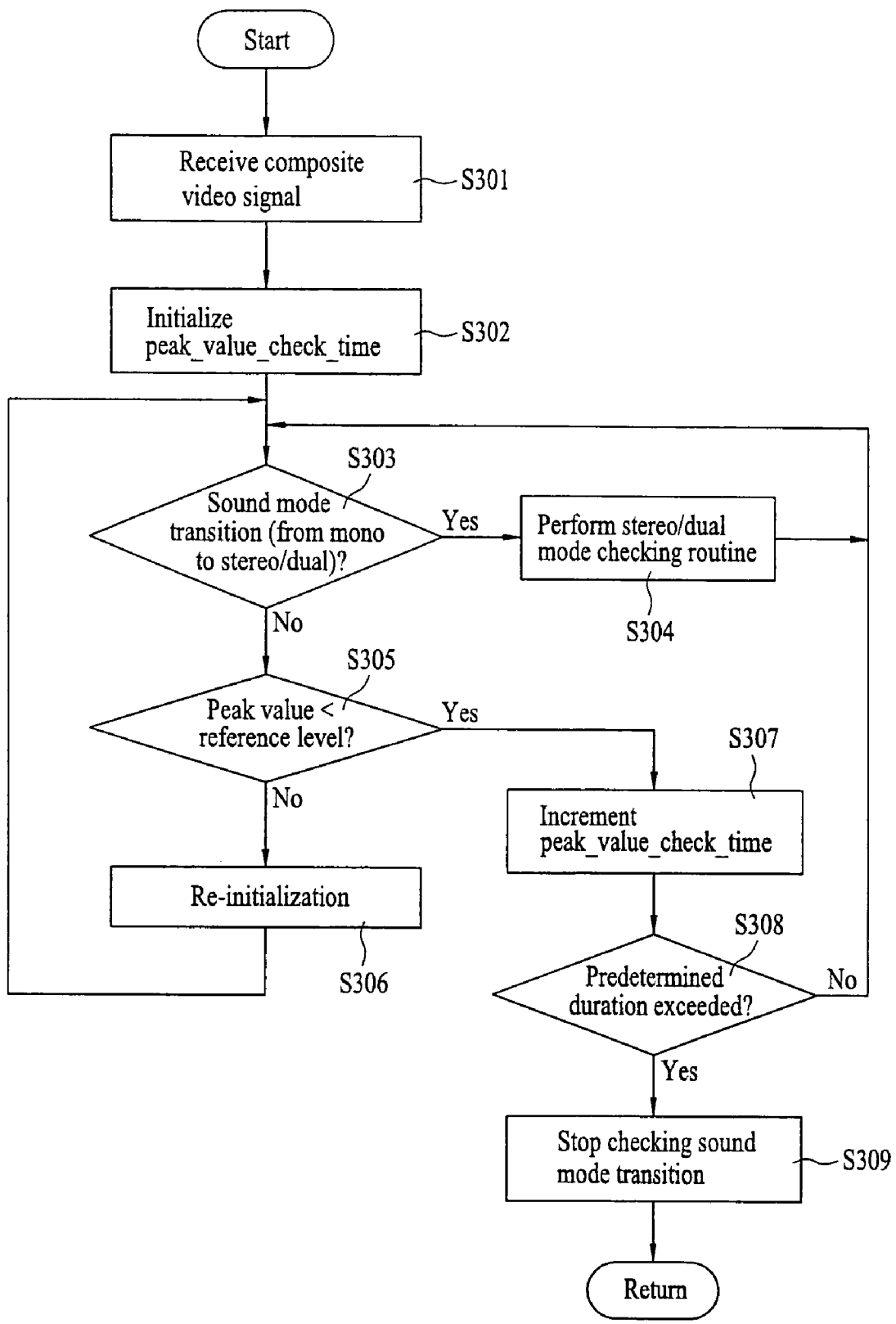
FIG. 3 is a flowchart of a method for processing a sound signal according to the present invention.

FIG. 3 illustrates a method of processing a sound signal according to the present invention, in which a program executable by the controller 204 in conjunction with the mode transition checker 203 is shown for a given determination of the sound system of the sound signal by the system discrimination 201 and where the sound mode is initially determined as the mono channel mode. Here, it is assumed that the sound signal processor (video device) has been initially powered, with a predetermined channel and mode selection, or that a command for selecting a specific broadcast channel command has been entered.

Referring to FIG. 3, in a step S301, a video device such as a television receiver including sound signal processor according to the present invention receives a composite video signal of a corresponding channel, which provides a separable sound signal, i.e., the SIF input of FIG. 2. A step S302 initializes conditions for measuring the amplitude (i.e., a peak or RMS value) of the sound signal, for example, by setting to zero a peak_value_check_time value. A step S303 checks whether a sound mode of the received sound signal makes a transition to a stereo/dual channel mode from the mono channel mode.

In the event that a transition to a stereo/dual channel mode has occurred, a mode checking operation is initiated. Here, it should be appreciated that the sound system determination (by the system discriminator 201) may specify a sound system having multiple modes. Thus, a stereo/dual mode checking routine (S304) may, according to the determined sound system, be performed using the mode transition checker 203, after which the program returns to the step S303.

Meanwhile, in the event that the step S303 determines that there has been no transition to a stereo/dual channel mode, a step S305 compares a peak value of the received sound signal with a reference level. That is, the amplitude of the demodulated sound signal is compared to a noise threshold of channel 2 (stereo/dual channel mode). As a result of the comparison step (S305), if the peak value is not less than the reference level, that is, if the sound signal is being received at a level above the reference level, the conditions for amplitude measurement are reinitialized in a step S306 and the program returns to the step S303 to again check whether the sound mode of the received sound signal makes a transition from the mono channel mode to a stereo/dual channel mode.

On the other hand, if there is (per S303) no transition of the sound mode of the received sound signal to the stereo/dual channel mode and the peak value is (per S305) less than the reference level, i.e., the received sound signal has dropped below threshold, it is determined whether the low level is sustained. That is, steps S307 and S308 are carried out to determine whether the state of the peak value being less than the reference level persists for a predetermined duration. Thus, while a repeatedly incrementing of the peak_value_check_time value with respect to an initialized timing point determining (in the comparison step) the presence of the low level state, i.e., a peak value less than the reference level, it can be determined, at least once, whether this state has been sustained. If the detected peak value never rises above the reference level during the predetermined duration, a step S309 is performed to stop checking the sound mode transition. That is, the controller 204 outputs a drive control signal for discontinuing the drive of the mode transition checker 203, thereby stopping the checking for a transition to a stereo/dual channel mode.

As described above, according to the present invention, if the received sound signal is in the mono channel mode, the sound signal amplitude is compared to a reference level. If the amplitude remains above the reference level, the controller determines that a transition of the sound signal to a stereo/dual channel mode has occurred, initializes all conditions, and returns to the step of checking for a sound mode transition; and if amplitude is less than the reference level, the controller determines whether the sub-threshold amplitude persists, whereby the controller determines that there is no stereo/dual channel mode for the sound signal and that the sound signal exists only in the mono channel mode, in which case the activity of checking the sound mode transition as conducted by the mode transition checker is stopped. Therefore, based on the dynamically measured amplitude of a sound signal, unnecessary checking for a sound mode transition can be avoided for a corresponding sound signal, whereby the generation of a plop noise, occurring due to the checking activity, can be prevented. By thus eliminating the plop noise, sound quality can be enhanced.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A sound signal processor for receiving a sound intermediate frequency (SIF) signal, comprising:
   a channel mode discriminator for determining a current sound mode of the received SIF signal;
   a mode transition checker for performing a checking operation to determine whether the current sound mode has resulted from a transition from a first sound mode to a second sound mode;
   an amplitude measurement circuit for measuring an amplitude of the received SIF signal wherein, if the measured amplitude is not less than a reference level, said mode transition checker repeatedly performs the checking operation; and
   a controller for controlling a drive of said mode transition checker according to the measured amplitude wherein, if the measured amplitude is less than the reference level, said controller stops driving said mode transition checker, and the reference level is equal to a noise threshold of a pilot signal of the second sound mode.

2. The sound signal processor of claim 1, wherein the first sound mode is a mono channel mode and wherein the second sound mode is a stereo/dual channel mode.

3. The sound signal processor of claim 2, wherein the stereo/dual channel mode comprises at least one Zweiton mode and at least one NICAM mode.

4. The sound signal processor of claim 1, wherein the measured amplitude is determined based on one of a peak value and a root-mean-square value of the SIF signal.

5. The sound signal processor of claim 1, further comprising:
   a demodulator for receiving the SIF signal and performing demodulation according to the current sound mode.

6. The sound signal processor of claim 5, wherein the measured amplitude is determined based on one of a peak value and a root-mean-square value of a sound signal output from said demodulator.

7. The sound signal processor of claim 1, wherein the received SIF signal includes data indicative of a sound system and a sound mode.

8. The sound signal processor of claim 7, further comprising:
   a system discriminator for determining a sound system according to the sound system data.

9. The sound signal processor of claim 7, wherein said controller outputs a demodulation control signal based on the sound system data and the sound mode data.

10. An apparatus for processing a sound signal, comprising:
   a system discriminator for determining a sound system according to sound system data included in the sound signal;
   a channel mode discriminator for determining a current sound mode of the received sound signal;
   a mode transition checker for performing a checking operation to determine whether the current sound mode has resulted from a transition from a first sound mode to a second sound mode;

a demodulator for demodulating the sound signal according to the determined sound system and the determined current sound mode;

a detector for detecting and measuring an amplitude of the demodulated sound signal wherein, if the measured amplitude is not less than a reference level, said mode transition checker repeatedly performs the checking operation; and a controller for controlling a drive of said mode transition checker according to the measured amplitude of the sound signal wherein, if the measured amplitude is less than the reference level, said controller stops driving said mode transition checker, and the reference level is equal to a noise threshold of a pilot signal of the second sound mode.

11. The apparatus of claim 10, wherein the sound system data of the sound signal is indicative of a sound signal carrier frequency of at least one of an MN system, a BG system, an I system, and a DK/K1/K2/K3 system.

12. A method of processing a received sound signal, the method comprising:

determining a current sound mode of the received sound signal;

checking the determined current sound mode, by a mode transition checker, to detect a transition from a first sound mode to a second sound mode;

measuring an amplitude of the received sound signal;

comparing the measured amplitude with a reference level, wherein said reference level is equal to a noise threshold of a pilot signal of the second sound mode;

controlling a drive of said mode transition checker according to the measured amplitude, and if the measured amplitude is less than the reference level, stopping the drive of the mode transition checker; and repeatedly performing said checking if the measured amplitude is not less than the reference level.

13. The method of claim 12, wherein the first sound mode is a mono channel mode and wherein the second sound mode is a stereo/dual channel mode.

14. The method of claim 13, wherein the stereo/dual channel mode comprises at least one Zweiton mode and at least one NICAM mode.

15. The method of claim 12, wherein the sound signal includes data indicative of a sound system and a sound mode.

16. The method of claim 15, further comprising:

demodulating the sound signal based on the sound system data and the sound mode data.

17. The method of claim 15, further comprising:

determining a sound system according to the sound system data.

18. A method of processing a sound signal in an apparatus for processing a sound signal including sound system data, the method comprising:

determining a sound system according to the sound system data;

determining a current sound mode of the received sound signal;

performing a checking operation to determine whether the determined current sound mode has resulted from a transition from a first sound mode to a second sound mode;

demodulating the sound signal according to the determined sound system and the determined current sound mode;

detecting and measuring an amplitude of the demodulated sound signal; and controlling a drive of the mode transition checker according to the detected amplitude of the sound signal, wherein said performing a checking operation by the mode transition checker comprises:

comparing the measured amplitude of the demodulated sound signal with a reference level;

continuously driving the mode transition checker, if the measured amplitude of the demodulated sound signal is not less than the reference level, and otherwise detecting and measuring the amplitude of the demodulated sound signal at least once; and stopping the drive of the mode transition checker, if the measured amplitude is less than the reference level, wherein the reference level is equal to a noise threshold of a pilot signal of the second sound mode.

19. The method of claim 18, wherein the determined sound system is one of an MN system, a BG system, an I system, and a DK/K1/K2/K3 system.

20. A television receiver having an apparatus for processing a sound signal, comprising:

a system discriminator for determining a sound system according to sound system data included in the sound signal;

a channel mode discriminator for determining a current sound mode of the received sound signal;

a mode transition checker for performing a checking operation to determine whether the determined current sound mode has resulted from a transition from a first sound mode to a second sound mode;

a demodulator for demodulating the sound signal according to the determined sound system and the determined current sound mode;

a detector for detecting and measuring an amplitude of the demodulated sound signal, wherein, if the measured amplitude is not less than a reference level, said mode transition checker repeatedly performs the checking operation; and a controller for controlling a drive of said mode transition checker according to the detected amplitude of the sound signal, wherein, if the measured amplitude is less than the reference level, said controller stops driving said mode transition checker, and the reference level is equal to a noise threshold of a pilot signal of the second sound mode.

* * * * *